United States Patent
Wang et al.

(10) Patent No.: US 7,093,969 B2
(45) Date of Patent: Aug. 22, 2006

(54) WIRE FIXING MECHANISM IN DISPLAYS AND BACK LIGHT MODULE USING THE SAME

(75) Inventors: Yun-Shih Wang, Taoyuan (TW); Yao-Tung Wang, Taoyuan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 177 days.

(21) Appl. No.: 10/711,626

(22) Filed: Sep. 29, 2004

(65) Prior Publication Data
US 2006/0067087 A1    Mar. 30, 2006

(51) Int. Cl.
*F21V 7/04* (2006.01)
(52) U.S. Cl. .......................................... 362/632; 349/58
(58) Field of Classification Search ........ 362/632–634; 349/58
See application file for complete search history.

(56) References Cited

U.S. PATENT DOCUMENTS 6,762,806 B1 * 7/2004 Matsuo et al. ................. 349/58
6,919,938 B1 * 7/2005 Choi et al. ..................... 349/58
2004/0160546 A1 * 8/2004 Huang et al. .................. 349/58

* cited by examiner

*Primary Examiner*—Stephen F Husar
(74) *Attorney, Agent, or Firm*—Jianq Chyun IP Office

(57) ABSTRACT

A wire fixing mechanism in a display is provided, which can be disposed on a frame in the display to fix at least one wire thereof. The wire fixing mechanism comprises a main part and an opening-control part. The main part is connected to the frame, and a fixing space is defined therebetween. The opening-control part is connected to the frame, separating the fixing space into a wire-hold space and a passage. The passage is convergent toward the wire-hold space. The place where the main part defines the passage and where the wire-hold space comes close has a first extending direction. The place where the opening-control part nears the main part has a second extending direction. The angle included by the first and second extending directions is an acute angle. The wire passes the passage and stays fixed in the wire-hold space when pressure is applied on the opening-control part.

14 Claims, 2 Drawing Sheets

WIRE FIXING MECHANISM IN DISPLAYS AND BACK LIGHT MODULE USING THE SAME

BACKGROUND OF THE INVENTION

1. Field of the Invention

The present invention relates to a wire fixing mechanism. More particularly, the present invention relates to a wire fixing mechanism in displays and a back light module using the same.

2. Description of the Related Art

With rapid development in electronic technologies, digital video products or imaging devices have become indispensable electronic gadgets in our daily life. Among various video products and imaging devices, display devices inarguably occupy a central position because a user must extract information from a display device, or in the case of performing a real-time control, receive real-time data from a display device. To fit the lifestyle of modern day people, the size and weight of video and imaging products must be made as light as possible. Although cathode ray tubes (CRT) displays still have some advantages, their bulkiness and volume are the two major setbacks that reduce its popularity in the future. With breakthroughs in photo-electronic and semiconductor fabrication technologies, the flat panel displays have become the mainstream of the display products.

The flat panel displays essentially include: organic electro-luminescence display (OELD), plasma display panel (PDP) display, liquid crystal display (LCD), light emitting diode (LED) display and field emission display (FED). Regardless of cathode ray tubes displays or the flat panel displays, a plurality of wires are used for power supplying or signal transmitting inside the displays. To fix the wires in the displays properly, appropriate wire fixing mechanism are necessary.

FIG. 1 is a diagram showing a conventional wire fixing mechanism. Please refer to FIG. 1. The conventional wire fixing mechanism 100 and a frame 50 of a display (not shown) are manufactured as an integrative unit. The wire fixing mechanism 100 includes a first fastener 110 and a second fastener 120. A wire-hold space 130 is defined between the first fastener 110 and the second fastener 120 and linked to the outside through an opening 140 kept therebetween.

If the size of the opening 140 is too small, it will be difficult for a wire 60 (only cross-sectional view of the wire 60 is shown in FIG. 1) to pass through the opening 140 into the wire-hold space 130. Besides, if the wire 60 is forced to pass through the opening 140 into the wire-hold space 130, a protective means 62 wrapped around the wire 60 can be easily busted. As a result, the wire 60 will possibly be fractured which will lead to electric leakage. On the other hand, if the size of the opening 140 is too large, the wire 60 can be pulled out easily from the wire-hold space 130 when external force is applied. Meanwhile, the welding connection between the device of the display and the wire 60 can be destroyed easily with the escape of the wire 60 from the wire-hold space 130.

Furthermore, the wires used in the back light module of the liquid crystal display are connected to the cold cathode fluorescent lamps (CCFL). While the wires are pulled out of the wire-hold space, the thin and delicate cold cathode fluorescent lamps can be torn out consequently. Therefore, the assembler needs to pay extra attention when fixing the wire to avoid making bad products. In other words, the quality of the wire fixing mechanism in displays has great impact on the time of the manufacturing process and the cost of the displays.

SUMMARY OF THE INVENTION

Accordingly, the present invention is directed to a wire fixing mechanism in displays suitable for improving the fixing effect of the wires such that the assembling time of the displays can be reduced and the cost of the displays can be lowered.

The present invention is also directed to a back light module suitable for improving the fixing effect of the wire such that the assembling time of the back light modules can be reduced and the cost of the back light modules can be lowered.

According to an embodiment of the present invention, a wire fixing mechanism in displays is provided. The wire fixing mechanism can be disposed on a frame of a display for fixing at least a wire of the display. The wire fixing mechanism in displays comprises a main part and an opening-control part. The main part is connected to the frame, and a fixing space is defined between the main part and the frame. The opening-control part is connected to the frame and separates the fixing space into a wire-hold space and a passage. The passage is convergent toward the wire-hold space. Wherein, the place where the main part defines the passage and where the wire-hold space comes close has a first extending direction. The place where the opening-control part nears the main part has a second extending direction. The angle included by the first extending direction and the second extending direction is an acute angle. When pressure is applied on the opening-control part, the wire can pass the passage and stay fixed in the wire-hold space.

According to another embodiment of the present invention, a back light module comprising a frame, a planar light source, a wire and a wire fixing mechanism is provided. The planar light source is disposed in the frame. The wire is connected to the planar light source. The wire fixing mechanism has the same configure with that described above and is mounted on the frame, so the description of the wire fixing mechanism is spared herein.

The back light module may further comprise a protective means that wraps around the wire. The protective means may be a heat-shrinkable tube or an insulated adhesive tape.

In addition, in the wire fixing mechanism in displays and the back light module described above, the width of the connection part between the wire-hold space and the passage can be smaller than the width of the wire. The main part and the frame can be manufactured as an integrative unit. The opening-control part and the frame can be manufactured as an integrative unit. The main part can be an L-shape, and the shape of the opening-control part can be a straight rod.

To sum up, in the wire fixing mechanism in displays and the back light module using the same of the present invention, the passage is convergent toward the wire-hold space, so the wire is prevented from escaping the wire-hold space by the main part and the opening-control part. Consequently, the fixing effect of the wire and the yield of the back light module can be improved, the assembling time of the displays can be shortened and the cost of the displays can be lowered.

BRIEF DESCRIPTION OF THE DRAWINGS

The accompanying drawings are included to provide a further understanding of the invention, and are incorporated

DESCRIPTION OF THE EMBODIMENTS

Figure 1:
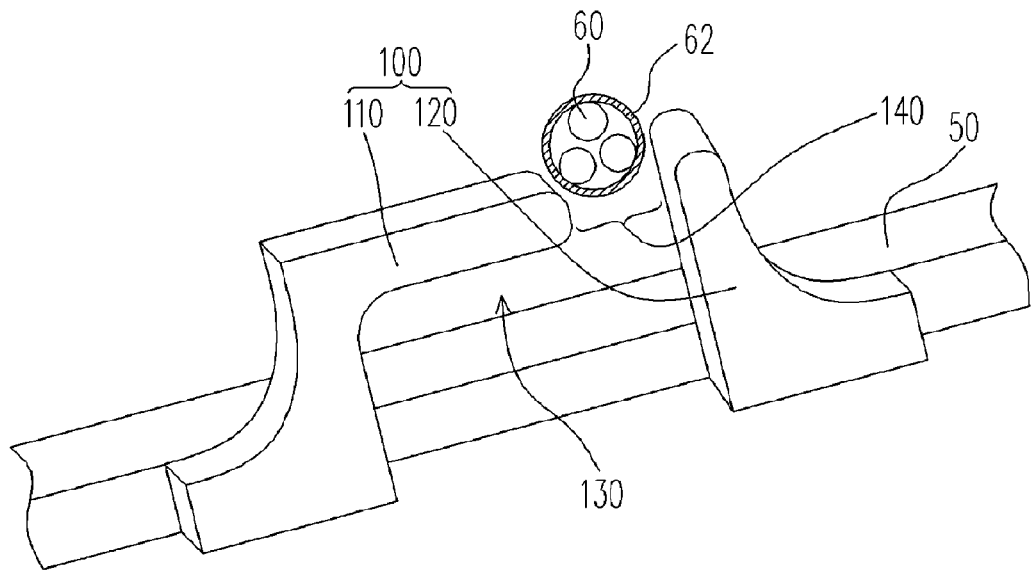
FIG. 1 is a diagram showing a conventional wire fixing mechanism.

Reference will now be made in detail to the present embodiments of the invention, examples of which are illustrated in the accompanying drawings. Wherever possible, the same reference numbers are used in the drawings and the description to refer to the same or like parts.

Figure 2:
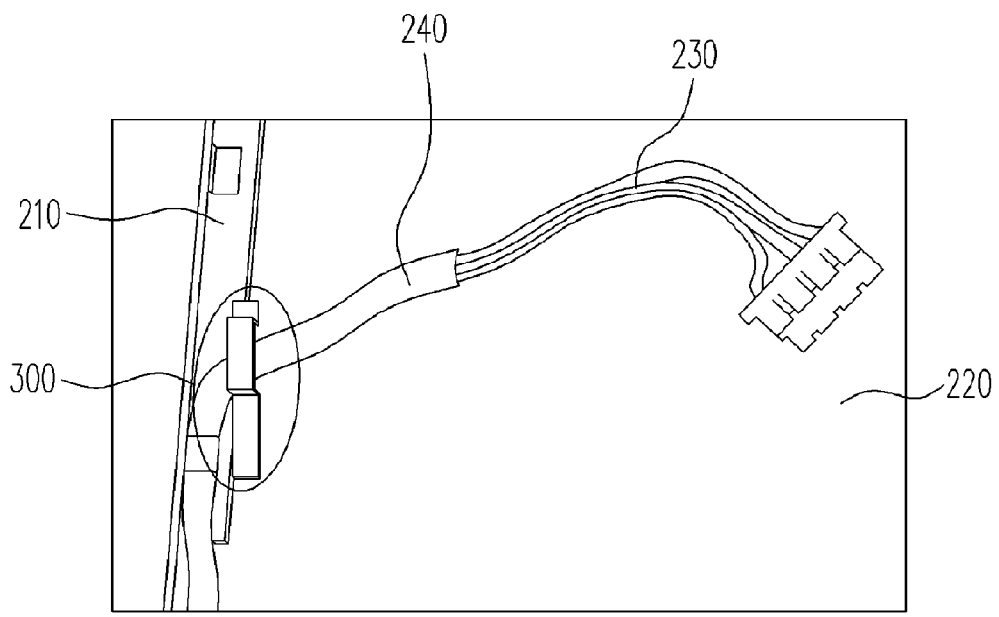
FIG. 2 is a diagram showing a partial back light module according to one embodiment of the present invention.

FIG. 2 is a diagram showing a partial back light module according to one embodiment of the present invention. Please refer to FIG. 2. The back light module 200 comprising a frame 210, a planar light source 220, a wire 230 and a wire fixing mechanism 300 in this embodiment is applied in a liquid crystal display, for example. The planar light source 220 is disposed in the frame 210. The light of the planar light source 220 can be provided by the cold cathode fluorescent lamp. The wire 230 is connected to the planar light source 220. The wire fixing mechanism 300 is mounted on the frame 210.

In addition, the back light module 200 may further comprise a protective means 240 that wraps around the wire 230. The protective means 240 is used to protect the wire 230 and prevent signal interference or electric leakage when the wire 230 is damaged. The protective means 240 can be a heat-shrinkable tube, an insulated adhesive tape or other suitable materials.

Figure 3:
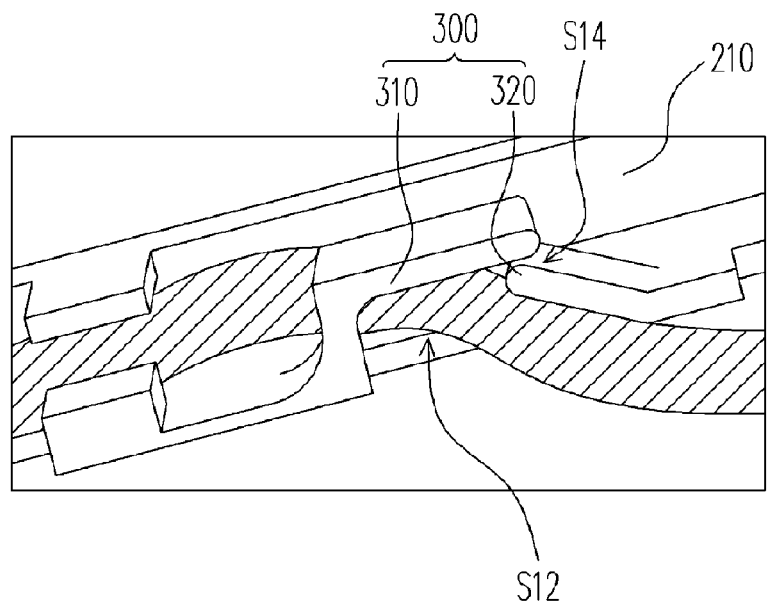
FIG. 3 is an enlarged diagram showing the wire fixing mechanism in FIG. 2 according to one embodiment of the present invention.
Figure 4:
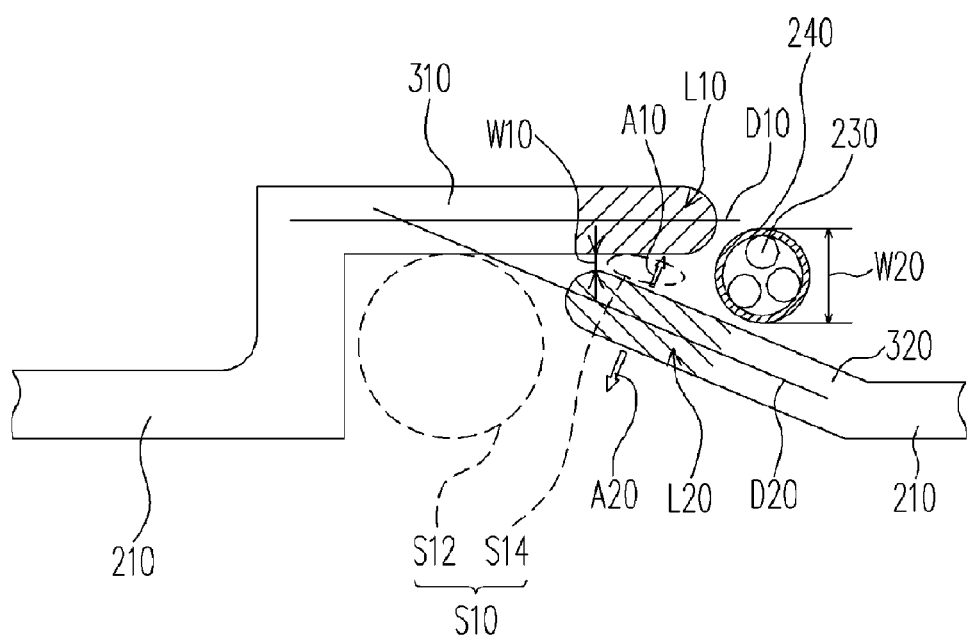
FIG. 4 is a lateral view showing the wire fixing mechanism in FIG. 3.

FIG. 3 is an enlarged diagram showing the wire fixing mechanism in FIG. 2 according to one embodiment of the present invention, and FIG. 4 is a lateral view showing the wire fixing mechanism in FIG. 3. Please refer to FIGS. 3 and 4. The wire fixing mechanism 300 in this embodiment comprises a main part 310 and an opening-control part 320. The main part 310 is connected to frame 210, and a fixing space S10 is defined by the main part 310 and the frame 210. In this embodiment, the main part 310 can be an L-shape as shown in the lateral view of FIG. 4. Certainly, the main part 310 can be other appropriate shapes. In addition, the main part 310 and the frame 210 can be manufactured as an integrative unit. Or, the main part 310 can also be adhered or fastened to the frame 210. Furthermore, the corner of the main part 310 is preferably an arc shape such that damage induced by the concentrated stress in the corner of the main part 310 can be prevented. Certainly, the connection part between the main part 310 and the frame 210 is also preferably an arc shape.

The opening-control part 320 is connected to the frame 210, and separates the fixing space S10 into a wire-hold space S12 and a passage S14. The opening-control part 320 and the frame 210 can be manufactured as an integrative unit. Alternatively, the opening-control part 320 can also be adhered or fastened to the frame 210. In this embodiment, the shape of the opening-control part 320 can be a straight rod as shown in the lateral view in FIG. 4. Certainly, the opening-control part 320 can be other appropriate shapes. The passage S14 is convergent toward the wire-hold space S12. In addition, the place where main part 310 defines the passage S14 and where the wire-hold space S12 comes close (region L10 of the main part 310 with oblique line in FIG. 4) has an extending direction D10. The place where the opening-control part 320 nears the main part 310 (region L20 of the main part 310 with oblique line in FIG. 4) has an extending direction D20. The angle included by the extending directions D10 and D20 is an acute angle. With the design described above, the wire 230 (only cross-sectional view of the wire 230 is shown in FIG. 4) can pass through the passage S14 easily and slide into the wire-hold space S12. Further, the width W10 in the connection between the wire-hold space S12 and the passage S14 is preferably smaller than the width W20 of the wire 230.

As described above, when pressure is applied on the opening-control part 320, the width W10 is broader than the width W20 of the wire 230 such that the wire can move down (in the direction of arrow A20) and then pass through the passage S14 and finally stay fixed in the wire-hold space S12. Owing to the elastic variation of the width W10, the wire fixing mechanism 300 will not destroy the protective means 240 wrapping around the wire 230.

On the other hand, when the wire 230 is being pulled out, the pressure will be applied on the opening-control part 320, which will be moved upward (in the direction of the arrow A10). In this situation, the width W10 becomes smaller or even zero such that the opening-control part 320 is pressed tightly against the main part 310. Therefore, the wire 230 will be held and will not escape from the wire-hold space S12. In this way, the cold cathode fluorescent lamps (not shown) connected to the wire 230 will not be pulled out and damaged.

Furthermore, when external force is not applied on the wire fixing mechanism 300, the opening-control part 320 can be designed to either touch the main part 310 or not.

It should be noted that even though the wire fixing mechanism in the above embodiment is used in the back light modules of the liquid crystal displays, the wire fixing mechanism in the present invention can be used in various types of displays to fulfil the wire-fixing requirement.

In the wire fixing mechanism in displays and the back light module using the same of the present invention, the passage is convergent toward the wire-hold space and the opening-control part can be deformed elastically. Consequently, the wire can pass through the passage and slide into the wire-hold space easily. Furthermore, when the wire is pulled from the wire-hold space, the opening-control part will be pressed by the wire tightly against the main part such that the wire is prevented from escaping the wire-hold space. In conclusion, the wire fixing mechanism in displays and the back light module using the same of the present invention can improve the fixing effect of the wire and the yield of the back light module, while shorten the assembling time and reduce the cost of the displays.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A back light module, comprising:
a frame;
a planar light source disposed in the frame;
a wire connected to the planar light source;
a wire fixing mechanism mounted on the frame, the wire fixing mechanism comprising:
a main part connected to the frame, a fixing space defined between the main part and the frame; and
an opening-control part connected to the frame, separating the fixing space into a wire-hold space and a passage, and the passage is convergent toward the wire-hold space, wherein the place where the main part defines the passage and where the wire-hold space comes close has a first extending direction, the place where the opening-control part nears the main part has a second extending direction, and the angle included by the first extending direction and the second extending direction is an acute angle, and the wire passes the passage and stays fixed in the wire-hold space when pressure is applied on the opening-control part.

2. The back light module according to claim 1, wherein the width of the connection part between the wire-hold space and the passage is smaller than the width of the wire.

3. The back light module according to claim 1, wherein the main part and the frame are manufactured as an integrative unit.

4. The back light module according to claim 1, wherein the opening-control part and the frame are manufactured as an integrative unit.

5. The back light module according to claim 1, wherein the main part is an L-shape.

6. The back light module according to claim 1, wherein the shape of the opening-control part is a straight rod.

7. The back light module according to claim 1, further comprising a protective means which covers the wire.

8. The back light module according to claim 1, wherein the protective means is a heat-shrinkable tube or an insulated adhesive tape.

9. A wire fixing mechanism in displays, which can be disposed on a frame of a display to fix at least one wire thereof, the wire fixing mechanism in displays comprising:
a main part connected to the frame, a fixing space defined between the main part and the frame; and
an opening-control part connected to the frame, separating the fixing space into a wire-hold space and a passage, and the passage is convergent toward the wire-hold space, wherein the place where the main part defines the passage and where the wire-hold space comes close has a first extending direction, the place where the opening-control part nears the main part has a second extending direction, and the angle included by the first extending direction and the second extending direction is an acute angle, and the wire passes the passage and stays fixed in the wire-hold space when pressure is applied on the opening-control part.

10. The wire fixing mechanism in displays according to claim 9, wherein the width in the connection part between the wire-hold space and the passage is smaller than the width of the wire.

11. The wire fixing mechanism in displays according to claim 9, wherein the main part and the frame are manufactured as an integrative unit.

12. The wire fixing mechanism in displays according to claim 9, wherein the opening-control part and the frame are manufactured as an integrative unit.

13. The wire fixing mechanism in displays according to claim 9, wherein the main part is an L-shape.

14. The wire fixing mechanism in displays according to claim 9, wherein the shape of the opening-control part is a straight rod.

* * * * *